B. H. SMITH.
ELECTRICAL MEASURING INSTRUMENT.
APPLICATION FILED JULY 28, 1917.
1,417,695.   Patented May 30, 1922.
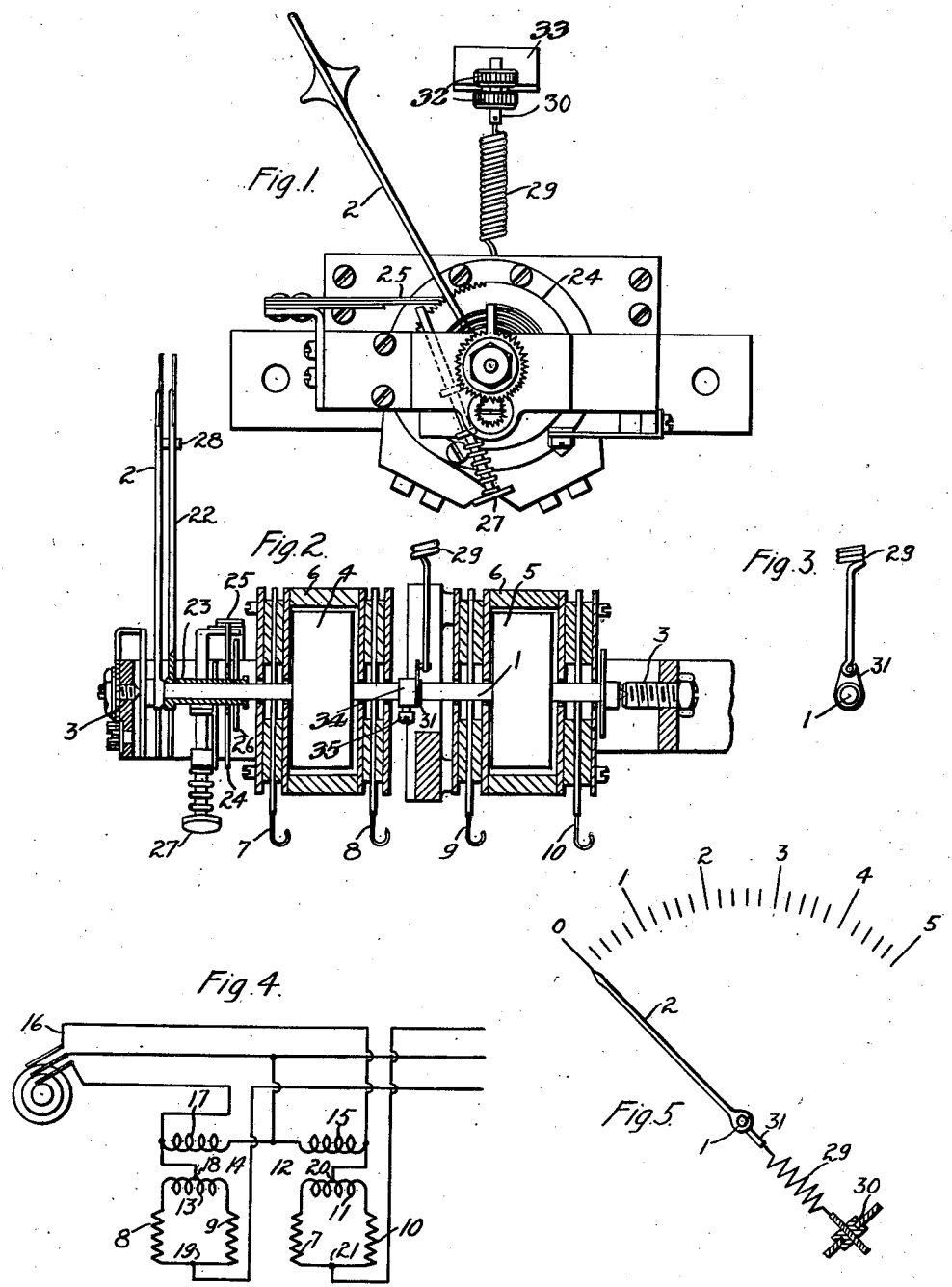
WITNESSES:
T. R. Krear
Fred H. Miller
INVENTOR
Benjamin H. Smith
BY
Wesley G. Carr
ATTORNEY

UNITED STATES PATENT OFFICE.

BENJAMIN H. SMITH, OF TURTLE CREEK, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

1,417,695.           Specification of Letters Patent.     Patented May 30, 1922.

Application filed July 28, 1917. Serial No. 183,333.

*To all whom it may concern:*

Be it known that I, BENJAMIN H. SMITH, a citizen of the United States, and a resident of Turtle Creek, in the county of Allegheny and State of Pennsylvania, have invented a new and useful Improvement in Electrical Measuring Instruments, of which the following is a specification.

My invention relates to electrical measuring instruments and particularly to calibrating means therefor.

One object of my invention is to provide a simple, reliable and accurate means for calibrating a measuring instrument.

A further object of my invention is to provide means whereby printed or stock dial faces may be effectively used in instruments designed for accurate indications.

Heretofore, it has been the custom, in some types of instruments, to calibrate the same after they were assembled. This required care and such instruments were liable to become disarranged before they were set up in working position. In view of the above, I provide instruments that shall not require the use of specially calibrated scales.

My device comprises a readily adjustable control spring that does not affect the zero reading of the instrument but which adapts the pointer of the same to be accurately corrected for all points throughout its range and thereby permits the use of a stock or printed scale.

My invention may be best understood in connection with the accompanying drawings in which Figure 1 is a front or face view of a portion of the instrument embodying my invention; Fig. 2 is a side elevation, partially in section, of the same; Fig. 3 is an end view of a part of the device as shown in Figs. 1 and 2; Fig. 4 is a diagrammatic view of the electric circuits for controlling my device, and Fig. 5 is a clarified diagrammatic representation of the mechanical scheme of the first three figures.

Copending application, Serial No. 159,925, filed April 5, 1917, by P. M. Lincoln and B. H. Smith and assigned to the Westinghouse Electric and Manufacturing Company, discloses a slowly-responsive wattmeter having a maximum-demand attachment, in association with which type of instrument the preferred adaptation of my present device is here shown.

A shaft 1, having a rigidly attached pointer 2 and bearings 3, is acted upon by bi-metallic spiral springs 4 and 5 that are coiled in opposite directions around the shaft 1. The springs 4 and 5 are respectively attached, at their inner ends, to the shaft 1 and, at their outer ends, to stationary casings 6. Coils 7, 8, 9 and 10 are disposed at the sides of the springs 4 and 5 and are adapted to maintain an equalizing temperature in the springs that will vary in accordance with the square of the sum and difference of the currents and voltages of two phases of a three-phase system. This will best be understood by reference to Fig. 4 where heating coils 7 and 10 are shown as connected in series relation to a winding 11 of a transformer 12, and the coils 8 and 9 as connected in series relation to a winding 13 of a transformer 14.

A winding 15 of the transformer 12 is connected in shunt relation to conductors of one phase of a circuit 16, the power traversing which is to be measured, and a winding 17 of the transformer 14 is connected in shunt relation to conductors of the other phase of the circuit 16.

Coils 8 and 9 are connected, in series relation, to one of the conductors of circuit 16, but in parallel relation to each other, by means of a mid-point connection at 18 to transformer winding 13 and a mid-point connection at 19 between their opposite terminals. Similarly, the coils 7 and 10 are connected, in series relation, to another conductor of circuit 16 but in parallel relation to each other by like mid-point connections at 20 and 21.

With the above-mentioned connections, the windings 7 and 10 are supplied with current in accordance with the sum and the difference of the current and voltage traversing one phase of the circuit 16 and the windings 8 and 9 are supplied with current in accordance with the sum and the difference of the current and voltage traversing another phase of the circuit 16.

Since the windings 7 and 8 are associated with the spring 4, the latter will be heated in accordance with the square of the sum of the currents and voltages of both phases of the circuit 16, and, since the spring 5 is associated with the windings 9 and 10, it will be heated in accordance with the square of the difference of the currents and voltages of both phases of the circuit 16. Consequently, since the springs 4 and 5 are opposed in their action, the resultant of their thermal responsive effects will be proportional to the power traversing the circuit 16.

A pointer 22 is mounted on a sleeve 23 that loosely surrounds the shaft 1 and upon which is also mounted a ratchet wheel 24. The ratchet wheel 24 is adapted to be engaged by a pawl 25, and a spring 26 is provided for returning the pointer 22 to its initial position when the pawl 25 is disengaged from the ratchet wheel 24. A spring-restrained plunger 27 is provided for moving the pawl 25 out of engagement with the ratchet wheel 24 when the pointer 22 is to be reset.

A lug or projection 28 is provided on the pointer 2 to move the free pointer 22 in one direction in accordance with the movement of the pointer 2. Thus, a maximum deflection of the pointer 2 will be indicated until the pawl 25 is disengaged from the ratchet wheel 24 by manipulation of the plunger 27.

The above description makes clear the operation of the type of instrument in association with which my invention may preferably be used.

My improved calibrating means comprises a control spring 29, preferably of the helical tension type, connected at one end, to an adjustable screw member 30 that co-operates with nuts 32 and a stationary base plate or member 33 for adjusting the tension of the spring 29. The other end of the spring 29 is connected to the outer end of a crank arm 31 that is secured to a sleeve 34. The sleeve 34 is mounted on the shaft 1 and is angularly adjustable thereabout by means of a set screw 35. In adjusting the instrument, the set screw 35 is released and the shaft 1 turned with respect to the sleeve 34 until the pointer is in its zero position, after which the set screw is tightened. During the above adjustment, the spring 29 remains in its position substantially radial to the shaft, irrespective of the tension force in the spring.

When the pointer 2 is in the zero position, as may best be understood from the simplified diagram of Fig. 5, the forces acting between the pointer 2 and the spring 29 are in equilibrium. These forces are also in alignment and it will readily be seen that these conditions will not be altered, or the zero reading disturbed, if the magnitude of the force supplied by the spring 29 be changed. When the pointer 2 is moved by the shaft 1, in response to any load, the distance the pointer will thus be moved will be a measure of the opposing force of the spring 29, irrespective of the magnitude of this force. When the pointer is actuated by a known load and does not come to rest opposite the marking on the scale representing that load, correction may be applied by adjustment of the spring 29. This correction will thereby be automatically made for all other loads and be accurately indicated on the scale.

Thus, printed, stamped or other kinds of stock dial faces may be readily used, regardless of the operating characteristics of the individual instruments. Corrections occasioned by bent pointers, misplaced dial faces, etc., may also be readily made without the employment of special skill.

My invention may be variously modified without departing from the spirit and scope of the same, as set forth in the appended claims.

I claim as my invention:

1. A measuring instrument comprising a pivoted indicating member, a yieldable positioning member therefor adjustably secured to the indicating member whereby the indicating member may be angularly adjusted with respect to the positioning member, and means for adjusting the tension of the positioning member.

2. A measuring instrument comprising a pivoted indicating member, an elongated flexible member extending substantially radially with respect to the pivot axis thereof, adjustable means for connecting one end of said flexible member to the indicating member at selective angular position about the pivot axis thereof, a stationary base member disposed adjacent to the other end of said flexible member, and an adjusting member mounted on said base member and connected to said flexible member to transmit adjusting movement thereto.

3. A measuring instrument comprising a pointer, a shaft therefor, a crank-arm member adjustably mounted on the shaft, a stationary base member disposed in position removed from said members, an adjusting member mounted on said base member, and a spring connected between said crank-arm and adjusting members.

4. A measuring instrument comprising a pointer, a shaft therefor, a sleeve embracing the shaft and movable thereabout, means for securing the sleeve in predetermined angular position on the shaft, a crank arm on the sleeve projecting laterally from the shaft, a stationary base member disposed in laterally offset position with respect to the shaft, an adjusting member mounted on the base member, and an elongated flexible member extending substantially radially with respect to the shaft and connected between the crank arm and said adjusting member.

5. A measuring instrument comprising a shaft, a pointer secured thereto, a sleeve embracing the shaft and angularly movable thereon, a set screw for securing the sleeve in predetermined angular position on the shaft, a crank arm on the sleeve projecting laterally from the shaft, a stationary base plate disposed in laterally offset position with respect to the shaft, an adjusting nut mounted on the base plate, an adjusting screw member longitudinally movable in the nut, and a helical tension spring connected at one end to one end of said screw member and at the other end to the outer end of said crank arm.

In testimony whereof, I have hereunto subscribed my name this 20th day of July 1917.

BENJAMIN H. SMITH.